(12) United States Patent
Sakaguchi

(10) Patent No.: US 9,234,154 B2
(45) Date of Patent: *Jan. 12, 2016

(54) ROLLING BEARING FOR ALTERNATOR

(75) Inventor: Kenta Sakaguchi, Iwata (JP)

(73) Assignee: NTN CORPORATION, Osaka (JP)

( * ) Notice: Subject to any disclaimer, the term of this patent is extended or adjusted under 35 U.S.C. 154(b) by 567 days.

This patent is subject to a terminal disclaimer.

(21) Appl. No.: 12/746,938

(22) PCT Filed: Dec. 16, 2008

(86) PCT No.: PCT/JP2008/072844
§ 371 (c)(1),
(2), (4) Date: Jun. 9, 2010

(87) PCT Pub. No.: WO2009/078401
PCT Pub. Date: Jun. 25, 2009

(65) Prior Publication Data
US 2010/0266231 A1    Oct. 21, 2010

(30) Foreign Application Priority Data
Dec. 18, 2007    (JP) .................................. 2007-326128

(51) Int. Cl.
*F16C 33/66*    (2006.01)
*C10M 169/02*    (2006.01)

(52) U.S. Cl.
CPC .......... *C10M 169/02* (2013.01); *F16C 33/6633* (2013.01); *C10M 2205/003* (2013.01); *C10M 2205/0285* (2013.01);
(Continued)

(58) Field of Classification Search
CPC ............. F16C 33/6633; C10M 169/02; C10N 2240/02

USPC .......................... 384/445, 462, 477, 484, 490
See application file for complete search history.

(56) References Cited

U.S. PATENT DOCUMENTS 3,272,576 A * 9/1966 Greby ........................... 384/604
4,082,381 A * 4/1978 Simmons et al. ............. 384/472
(Continued)

FOREIGN PATENT DOCUMENTS

JP        5-263091       10/1993
JP        2001-123190    5/2001
(Continued)

OTHER PUBLICATIONS

International Search Report issued Mar. 17, 2009 in International (PCT) Application No. PCT/JP2008/072844.

*Primary Examiner* — Thomas R. Hannon
(74) *Attorney, Agent, or Firm* — Wenderoth, Lind & Ponack, L.L.P.

(57) ABSTRACT

A rolling bearing includes a plurality of rolling elements disposed between an inner race and an outer race and a retainer retaining the rolling elements. Lubricating grease is sealed in the bearing in an amount of not less than 20% of an entire spatial volume of an interior of the rolling bearing and not more than 80% of a stationary spatial volume of the interior of the rolling bearing. The lubricating grease includes a base oil having a dynamic viscosity at 40° C. of 13-73 cSt, and a thickening agent of aromatic urea family. The entire spatial volume is an entire interior volume of the bearing minus a total volume of the rolling elements and the retainer, and the stationary spatial volume is a portion of the entire spatial volume where neither the rolling elements nor the retainer passes while the bearing is rotating.

6 Claims, 3 Drawing Sheets

(52) U.S. Cl.
CPC ............... *C10M 2207/0406* (2013.01); *C10M 2215/1026* (2013.01); *C10N 2220/022* (2013.01); *C10N 2230/08* (2013.01); *C10N 2240/02* (2013.01); *C10N 2240/20* (2013.01); *C10N 2250/10* (2013.01); *F16C 2361/63* (2013.01); *F16C 2380/26* (2013.01)

(56) References Cited

U.S. PATENT DOCUMENTS

| | | | |
|---|---|---|---|
| 5,301,923 A * | 4/1994 | Asao et al. | 508/410 |
| 5,320,027 A * | 6/1994 | Saitoh | 92/158 |
| 2002/0051595 A1 * | 5/2002 | Goto et al. | 384/490 |
| 2004/0028301 A1 * | 2/2004 | Kull et al. | 384/107 |
| 2007/0161520 A1 * | 7/2007 | Kawamura | 508/390 |
| 2007/0286538 A1 * | 12/2007 | Mizutani | 384/112 |

FOREIGN PATENT DOCUMENTS

| | | |
|---|---|---|
| JP | 2004-210971 | 7/2004 |
| JP | 2005-048044 | 2/2005 |
| JP | 2005-112955 | 4/2005 |
| JP | 2005-298629 | 10/2005 |

* cited by examiner

Base oil viscosity and bearing temp.

ROLLING BEARING FOR ALTERNATOR

TECHNICAL FIELD

This invention relates to a rolling bearing for an alternator for supporting a rotary shaft of an alternator, i.e. an alternating current generator for a vehicle.

BACKGROUND ART

The term "vehicle alternator" ordinarily refers to an alternating current generator for generating electricity by receiving rotation of a vehicle engine through a belt, and storing the thus generated electric power in a battery or supplying it to electric loads on the vehicle.

As shown in FIG. 2, such an alternator includes a rotary shaft 13 carrying a rotor 12 and rotatably supported by a housing through a pair of ball bearings A. The rotor 12 carries a rotor coil 15. A stator 16 is provided around the rotor 12 and includes three stator coils 17 arranged at angular intervals of 120°.

The rotary shaft 13 is rotated by the torque transmitted from the vehicle engine to a pulley 20 mounted on the tip of the rotary shaft 13 through a belt (not shown). Electric current thus flows through the rotor coil 15, which induces alternating currents in the respective three stator coils 17 in three phases. The thus induced three-phase alternating currents are full-wave rectified by a rectifier 21 and stored in a battery.

Since the pulley 20 is mounted to the rotary shaft 13 in a cantilever manner, and it vibrates when the rotary shaft 13 rotates at a high speed, especially the ball bearing A supporting the shaft 13 near the pulley 20 is subjected to severe loads. Numerals 18 and 19 in FIG. 2 indicate a step ring and a fan, respectively.

Since rolling bearings for use in alternators are rotated at high speed in heated engine room, they may be heated to 180° C. or over, and also may be rotated at 1000 rpm or over. Thus, they have to be capable of withstanding use in extremely harsh environments.

Such rolling bearings for use in alternators are required to be heat-resistant, and to be able to rotate at low torque. High durability is also required.

For this purpose, it is necessary to selectively use heat-resistant base oil and thickening agents in lubricating grease sealed in such rolling bearings. For example, it is known to use lubricating grease comprising a base oil in the form of a mixture of alkyl diphenyl ether oil and poly-α-olefin oil, and 5 to 40% by weight of an aromatic diurea compound as a thickening agent (Patent document 1).

There is also known a rolling bearing for use in electronic devices and air-conditioners in which lubricating grease having a dynamic viscosity of 30 to 70 cSt at 40° C. is sealed such that it accounts for 5 to 20% by volume of the entire inner void space of the bearing (Patent document 2).

Patent document 1: JP Patent Publication 5-263091A
Patent document 2: JP Patent Publication 2001-123190A

DISCLOSURE OF THE INVENTION

Object of the Invention

Of the above-mentioned conventional rolling bearings, with the former rolling bearing (disclosed in Patent document 1), the amount of lubricating grease sealed in the bearing is not specified that can increase the duration time (life span) of the rolling bearing, and thus neither is the viscosity of the base oil necessary to increase the life span of the bearing.

The latter invention (disclosed in Patent document 2) is not directed to a rolling bearing for use in an alternator but to a rolling bearing for use in a low-load hard disk drive, or for supporting a fan motor shaft of an air-conditioner, which is rotated at a low speed of about 7000 rpm. Thus, the technical data regarding the proper sealing amount of grease in this bearing or proper dynamic viscosity of its base oil cannot be used as it is for rolling bearings for alternators.

An object of the present invention is to sufficiently suppress heat-up of a rolling bearing for an alternator, prevent deterioration of lubricating grease due to heat-up of the rolling bearing, and to extend the lubricating life of the rolling bearing. This object has not been achieved in the prior art, as described above.

Means to Achieve the Objects

In order to achieve the above object, according to this invention, lubricating grease is prepared which contains a base oil having a dynamic viscosity of 13 to 73 cSt at 40° C. and is thickened by an aromatic urea thickening agent, and the thus prepared lubricating grease is sealed in a rolling bearing having both end surfaces thereof sealed such that the lubricating grease accounts for 20% or more by volume of the entire inner void space of the rolling bearing, and accounts for 80% or less by volume of a stationary inner space of the bearing.

As used herein, "entire inner void space" refers to the portion of the closed space defined by the inner and outer races and the seal members that is not occupied by the rolling elements or the retainer.

As used herein, "stationary inner space" refers to the portion of the closed space defined by the inner and outer races and the seal members where the rolling elements and the retainer do not pass.

With the rolling bearing for use in an alternator according to the present invention, since the base oil of the lubricating grease has a dynamic viscosity of 13 to 73 cSt at 40° C., the bearing is less likely to heat up due to resistance produced when base oil bleeding into the bearing is stirred, while maintaining viscosity necessary for lubrication. Thus, it is possible to keep the bearing temperature at about 160° C. or less during use in an alternator.

If soft lubricating grease is used of which the dynamic viscosity is less than 13 cSt at 40° C., it cannot sufficiently lubricate a ball bearing (such as a deep groove ball bearing). If hard lubricating grease is used of which the dynamic viscosity is higher than 73 cSt at 40° C., the bearing tends to be heated excessively due to resistance produced when the lubricating grease is stirred. Thus, the bearing temperature tends to exceed 160° C. when the bearing is used at high speed of 10000 to 20000 rpm, which in turn tends to result in deterioration of the lubricating grease.

According to the present invention, since lubricating grease is used which is thickened by an aromatic urea thickening agent, which has high heat resistance, the thickening agent stably maintains its expected function even at high temperature exceeding 100° C., so that the lubricating grease maintains a required viscosity even at high temperature, which makes it possible to stably supply base oil to required surfaces at a proper rate. Thus, it is possible to stably suppress the bearing temperature over a prolonged period of time.

The lubricating grease is sealed in the rolling bearing so as to account for 20% or more by volume of the entire inner void space of the rolling bearing, and 80% or less by volume of the stationary inner space of the bearing.

Since the lubricating grease is sealed in the bearing such that it accounts for 20% or more by volume of the entire inner void space of the rolling bearing, compared to a bearing in which lubricating grease is sealed by less than 20%, it is possible to markedly extend (by 350 hours or more) the endurance time (life) of the bearing when used at high speed (e.g. at 20000 rpm). If the lubricating grease sealed in the bearing accounts for less than 20% by volume of the entire inner void space of the bearing, the endurance time (life) of the bearing during use tends to be markedly short, i.e. about 100 hours.

Since the lubricating grease is sealed such that it accounts for 80% or less by volume of the stationary inner space of the bearing, it is possible to prolong the endurance time (life) of the bearing during use, while ensuring sufficient lubrication. If the sealed lubricating grease accounts for more than 80% by volume of the stationary inner space of the bearing, lubricating oil may leak out of the rolling bearing. Also, if the content of the sealed lubricating grease is this high, the bearing temperature tends to rise. Especially if the content of the sealed lubricating grease is higher than 85% of the stationary inner space of the bearing, the bearing tends to be heated excessively.

When a rolling bearing for an alternator is rotated at a high speed, mirror abrasion tends to occur on their raceways. The surfaces newly generated at this time acts as catalyst and tend to decompose lubricating grease, producing hydrogen. The hydrogen thus produced tends to infiltrate into steel, thereby making the raceways brittle. This may cause metal flaking due to hydrogen brittleness.

In order to avoid this problem, the base oil of the lubricating grease preferably contains 15 to 100% by weight of ether oil. Since either oil shows a relatively strong bond to hydrogen, hydrogen originating from the base oil is less likely to be produced on the raceways.

More preferably, the base oil of the lubricating grease comprises a mixture of 15 to 95% by weight of ether oil and 5 to 85% by weight of poly-α-olefin oil in order to reliably prevent hydrogen brittleness and ensure lubricity required for the ball bearing.

In order to achieve as long a life of the rolling bearing as possible, aromatic diurea is preferably used as the aromatic urea thickening agent because aromatic diurea has high heat resistance. Among urea thickening agents, in view of molecular structure, aromatic diureas containing many benzene rings and high in oxidation resistance are preferable, such as aromatic diurea containing 4,4'-diphenylmethane diisocyanate as isocyanate groups and high in heat resistance.

Advantages of the Invention

The rolling bearing for an alternator according to the present invention uses lubricating grease comprising a base oil having a predetermined dynamic viscosity and thickened by an aromatic urea thickening agent, and this lubricating grease is sealed in the rolling bearing by a predetermined amount. Thus, it is possible to suppress heating of the bearing while the bearing is rotating, and prevent deterioration of the lubricating grease due to heating of the bearing. Due to these and other advantages, it is possible to prolong the lubricating life of the rolling bearing for an alternator.

In such a rolling bearing for an alternator, by using a base oil comprising a mixture of ether oil and poly-α-olefin oil, it is possible to prevent hydrogen brittleness and ensure lubricity required for the ball bearing. Thus, it is possible to further prolong the lubricating life of the rolling bearing for an alternator.

In the arrangement in which the aromatic urea thickening agent is aromatic diurea, especially one having in its molecular structure 4,4'-diphenylmethane diisocyanate as isocyanate groups, the thickening agent can stably perform its expected function even the bearing is used in a high-temperature environment exceeding 100° C., and the bearing temperature is stably suppressed over a prolonged period of time. Thus, it is possible to extend the lubricating life of the bearing.

DESCRIPTION OF THE NUMERALS

Figure 1:
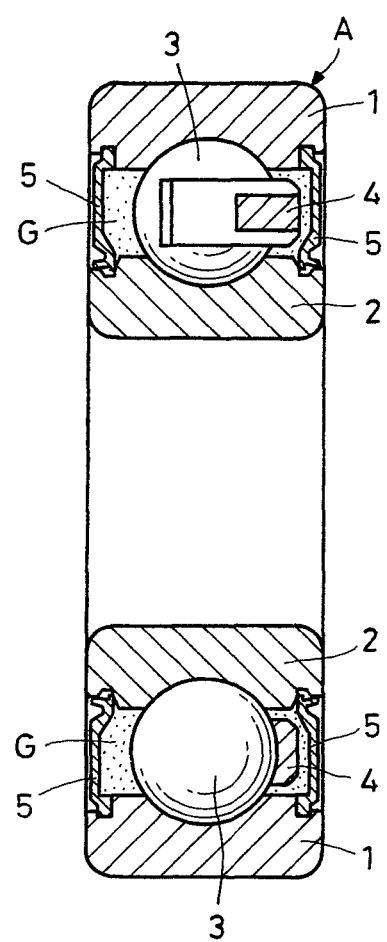
FIG. 1 is a sectional view of an embodiment.
Figure 2:
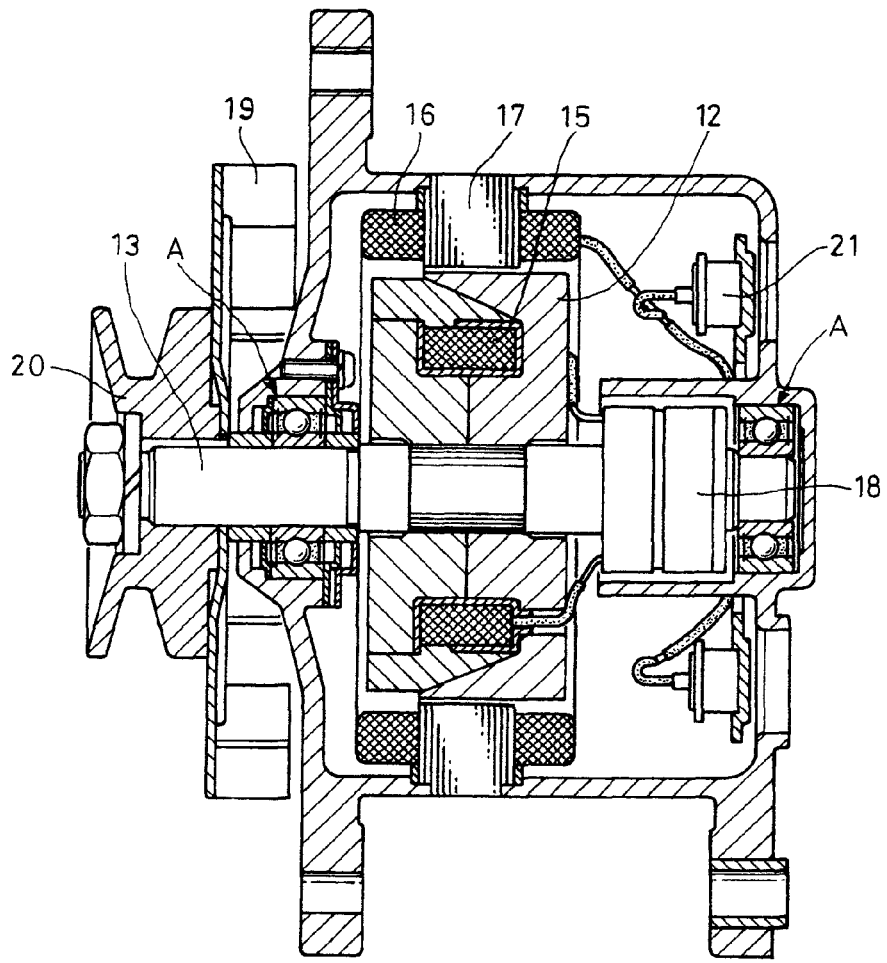
FIG. 2 is a sectional view of an alternator, showing how the embodiment is used.

1. Outer race
2. Inner race
3. Rolling element
4. Retainer
5. Seal member
12. Rotor
13. Rotary shaft of the rotor
15. Rotor coil
16. Stator
17. Stator coil
18. Step ring
19. Fan
20. Pulley
21. Rectifier

BEST MODE FOR EMBODYING THE INVENTION

Now the structure of the rolling bearing for use in an alternator is described with reference to the drawings.

As shown in FIG. 1, the rolling bearing for use in an alternator embodying the invention, which is a deep groove ball bearing, comprises concentrically arranged inner and outer races 2 and 1, a plurality of rolling elements 3 in the form of balls disposed between the inner and outer races 2 and 1, a retainer 4 retaining the rolling elements 3, and seal members 5 fixed to the outer ring 1 and sealing the openings at both axial ends, respectively. In this rolling bearing A, lubricating grease G comprising a base oil having a dynamic viscosity of 13 to 73 cSt at 40° C., and an aromatic urea thickening agent is sealed in such an amount that it accounts for 20% or more by volume of the entire inner void space of the bearing, and 80% or less by volume of the stationary inner space of the bearing.

The base oil used in this invention, which has a dynamic viscosity of 13 to 73 cSt at 40° C., has a viscosity sufficient to suppress a temperature rise of the rolling bearing while keeping required lubricity of the grease.

Rolling bearings for use in alternators are required to have a life span of at least 1000 hours when used in an environment where they are heated to 160° C. due to self-heating. If a base oil having a dynamic viscosity exceeding 73 cSt at 40° C. is used, the bearing tends to be heated to over 160° C. due to self-heating. This shortens the life span of the bearing. If a base oil having a dynamic viscosity less than 13 cSt at 40° C. is used, oil film having a required thickness is difficult to form on deep groove ball bearings, which are most preferred rolling bearings for use in alternators.

The base oil used in the present invention may be any known synthetic lubricating oil or mineral oil. Preferably, the base oil used in the present invention is a mineral oil such as a paraffinic mineral oil or a naphthenic mineral oil, a synthetic hydrocarbon oil such as poly-α-olefin oil (PAO), an ether oil such as polyphenyl ether, dialkyl ether or alkylphenyl ether, including dialkyl diphenyl ether oil, alkyl triphenyl ether oil or alkyl tetraphenyl ether oil, an ester oil such as diester oil, polyol ester oil, complex ester oil thereof, aromatic ester oil or carbonate ester oil, or a mixture thereof.

In view of seizure-resistant life at high temperature, i.e. heat resistance and oxidation resistance, ester oil is most preferable, followed by intermediate-viscosity PAO and then by low-viscosity PAO.

In order to prevent metal peeling due to hydrogen brittleness, the base oil of the lubricating grease preferably contains ether oil. For example, the base oil is preferably a mixture of ether oil and poly-α-olefin oil, which ensures proper lubricity. In order to prevent hydrogen brittleness and ensure required lubricity of the ball bearing, the base oil of the lubricating grease is particularly preferably a mixture of 15-95% by weight of ether oil and 5-85% by weight of poly-α-olefin oil. For this purpose, the base oil is more preferably a mixture of 15-25% by weight of ether oil and 75-85% by weight of poly-α-olefin oil.

The thickening agent added to thicken the base oil is an aromatic urea thickening agent. Among aliphatic diurea, alicyclic diurea and aromatic diurea, alicyclic diurea is relatively superior in stability of crystal structure, shear stability, adhesion and leakage resistance. But aromatic diurea is much more superior in these properties. For torque, pressure feed properties and fluidity, aliphatic diurea is most superior, followed by alicyclic diurea. But for a rolling bearing for use in an alternator, it is preferable to use lubricating grease containing aromatic diurea because aromatic diurea is superior in the ability to form oil film and heat resistance.

To the lubricating grease, a thickening agent is preferably added which has, in the molecular structure of the aromatic urea, 4,4'-diphenylmethane diisocyanate as isocyanate groups, because such a thickening agent has a high molecular weight and superior heat stability. Such a thickening agent is preferable also because its intermolecular distance is short and the hydrogen bond strength between OH groups is high.

An aromatic diurea compound containing diphenylmethane diisocyanate (MDI) as isocyanate groups is preferred to an aromatic diurea compound containing tolylene diisocyanate (MDI) as isocyanate groups, because the former has a hydrogen bond dissociation temperature (temperature at which the peak showing the NH stretching vibration shifts from 3300 cm$^{-1}$ to 3400 cm$^{-1}$) that is higher by 70° C. than the latter.

EXAMPLE 1 OF THE INVENTION

A base oil was prepared which is a mixture of 80% by weight of ether oil and 20% by weight of low-viscosity poly-α-olefin oil and having a dynamic viscosity of 72.3 cSt at 40° C. 1 mole of tolylene diisocyanate (TDI) was dissolved into half of the base oil thus prepared. 2 moles of a monoamine comprising para-toluidine was dissolved into the remaining half of the base oil. They were then mixed and stirred together, and reacted for 30 minutes at 100-120° C. to yield an aromatic diurea compound in the base oil, thus obtaining lubricating grease which is thickened by an aromatic urea thickening agent.

1.8 g of the thus obtained lubricating grease was sealed in a deep groove ball bearing (6204LLB made by NTN Corporation; with non-contact rubber seals on both sides; made of high-carbon chrome bearing steel; 12.8 mm in outer diameter, 47 mm wide and 20 mm in inner diameter) such that the lubricating grease accounts for 40% by volume of the entire inner void space of the bearing.

Figure 3:
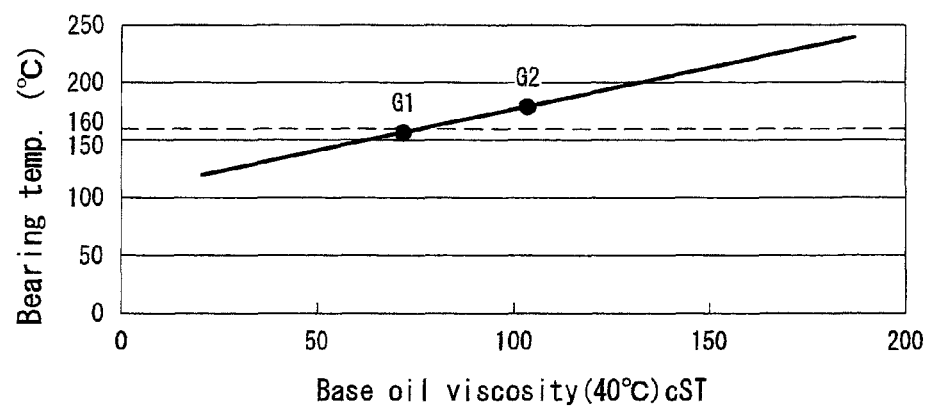
FIG. 3 is a graph showing the relationship between the base oil viscosity of lubricating grease used in an experiment and the rolling bearing temperature.

The thus obtained rolling bearing was operated continuously for five minutes at 18000 rpm at room temperature under a load of 78.45 N (8 kgf) to measure the temperature of the bearing (bearing heating test). This test was conducted three times and the average of the three temperatures measured (153° C., 156° C. and 154° C.) is shown in the graph of FIG. 3 (G1). FIG. 3 indicates that the bearing temperature can be maintained at 160° C. as long as the dynamic viscosity at 40° C. is kept at 73 cSt or below.

COMPARATIVE EXAMPLE 1

A rolling bearing was prepared in exactly the same manner as Example 1 of the invention except that the base oil having a dynamic viscosity of 103 cSt at 40° C. was prepared in the form of a mixture of 80% by weight of ether oil and 20% by weight of intermediate-viscosity poly-α-olefin oil. The bearing thus prepared was subjected to the same bearing heating test as above. This test was conducted three times and the average of the three temperatures measured (180° C., 172° C. and 176° C.) is shown in the graph of FIG. 3 (G2).

FIG. 3 indicates that if hard lubricating grease having a dynamic viscosity at 40° C. exceeding 73 cSt is used, the rolling bearing could be heated to a temperature exceeding 160° C., which could detrimentally influence the life of the bearing.

EXAMPLE 2 OF THE INVENTION

A base oil was prepared which is a mixture of 20% by weight of ether oil and 80% by weight of intermediate-viscosity poly-α-olefin oil and having a dynamic viscosity of 72.3 cSt at 40° C. 1 mole of 4,4'-diphenylmethane diisocyanate (MDI) was dissolved into half of the base oil thus prepared. 2 moles of a monoamine comprising para-toluidine was dissolved into the remaining half of the base oil. They were then mixed and stirred together, and reacted for 30 minutes at 100-120° C. to yield an aromatic diurea compound in the base oil, thus obtaining lubricating grease which is thickened by an aromatic urea thickening agent.

The thus obtained lubricating grease was sealed in a deep groove ball bearing (6206LLB made by NTN Corporation; with non-contact rubber seals on both sides; made of high-carbon chrome bearing steel; 62 mm in outer diameter, 16 mm wide and 30 mm in inner diameter) in such an amount that the lubricating grease accounts for 24% by volume of the entire inner void space of the bearing.

The thus obtained rolling bearing was operated under a radial load of 490 N at 20000 rpm to measure its endurance time. The endurance time was 440 hours, which was plotted in the graph of FIG. 4 (B2).

EXAMPLE 3 OF THE INVENTION

A rolling bearing was prepared in exactly the same manner as in Example 2 of the invention, except that the grease was sealed in the deep groove ball bearing such that the lubricating grease accounts for 50% by volume of the entire inner void space of the bearing.

The thus obtained rolling bearing was operated under a radial load of 490 N at 20000 rpm to measure its endurance time. The endurance time was 400 hours, which was plotted in the graph of FIG. 4 (B3).

COMPARATIVE EXAMPLE 2

A rolling bearing was prepared in exactly the same manner as in Example 2 of the invention, except that the grease was sealed in the deep groove ball bearing such that the lubricating grease accounts for 12% by volume of the entire inner void space of the bearing.

The thus obtained rolling bearing was operated under a radial load of 490 N at 20000 rpm to measure its endurance time. The endurance time was 100 hours, which was plotted in the graph of FIG. 4 (b2).

COMPARATIVE EXAMPLE 3

A rolling bearing was prepared in exactly the same manner as in Example 2 of the invention, except that the grease was sealed in the deep groove ball bearing such that the lubricating grease accounts for 8% by volume of the entire inner void space of the bearing.

The thus obtained rolling bearing was operated under a radial load of 490 N at 20000 rpm to measure its endurance time. The endurance time was 80 hours, which was plotted in the graph of FIG. 4 (b3).

Figure 4:
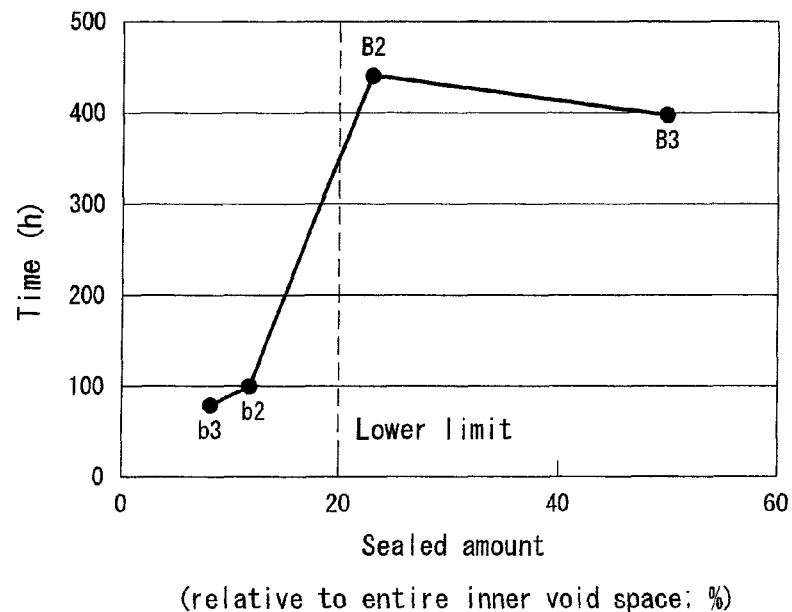
FIG. 4 is a graph showing the relationship between the initial amount of lubricating grease sealed in the rolling bearing and the life of the rolling bearing.

As will be apparent from the results of FIG. 4, the lives of the rolling bearings in which the lubricating grease is sealed such that it accounts for 20% or over by volume of the entire inner void space of the bearing are longer than 400 hours, and the difference in life between Examples of the invention and Comparative Examples 1 and 2 is large, i.e. about 350 hours.

EXAMPLE 4 OF THE INVENTION

A rolling bearing was prepared in exactly the same manner as in Example 2 of the invention, except that the grease was sealed in a deep groove ball bearing (6204LLB made by NTN Corporation; with non-contact rubber seals on both sides; made of high-carbon chrome bearing steel; 12.8 mm in outer diameter, 47 mm wide and 20 mm in inner diameter) in such an amount that the lubricating grease accounts for 75% by volume of the stationary inner space of the bearing.

The thus obtained rolling bearing was operated under a radial load of 67 N at 10000 rpm, and leakage of grease was checked from the difference in amount of the grease in the bearing before and after the test. The result is plotted in the graph of FIG. 5 (B4).

COMPARATIVE EXAMPLES 4 TO 7

Rolling bearings of Comparative Examples 4 to 7 were prepared in exactly the same manner as in Example 4 of the invention, except that the grease was sealed in each deep groove ball bearing (6204LLB made by NTN Corporation; with non-contact rubber seals on both sides; made of high-carbon chrome bearing steel; 12.8 mm in outer diameter, 47 mm wide and 20 mm in inner diameter) in such amounts that the lubricating grease accounts for 110, 120, 140 and 150% by volume of the stationary inner space of the respective bearings.

The thus obtained rolling bearings were operated under a radial load of 67 N at 10000 rpm, and leakage of grease was checked from the difference in amount of the grease in the respective bearings before and after the test. The results are plotted in the graph of FIG. 5 (b4 to b7).

Figure 5:
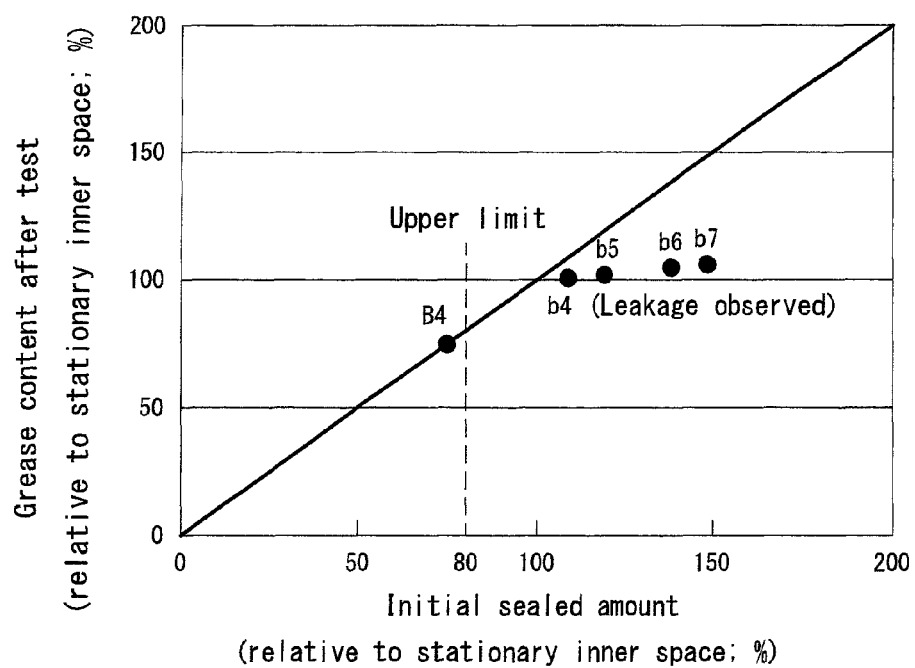
FIG. 5 is a graph showing the relationship between the amounts of lubricating grease sealed in the rolling bearing before and after a test.

As is apparent from the results of FIG. 5, there was no leakage of grease for rolling bearings in which the lubricating grease was sealed such that it accounts for 80% or less by volume of the stationary inner space of the bearing.

What is claimed is:

1. A rolling bearing for use in an alternator, the rolling bearing comprising:
    an inner race;
    an outer race which is concentric with the inner race;
    a plurality of rolling elements disposed between the inner race and the outer race;
    a retainer retaining the rolling elements;
    seal members fixed to the outer race and sealing openings at axial ends of the rolling bearing; and
    lubricating grease sealed in the bearing in an amount of not less than 20% of an entire spatial volume of an interior of the rolling bearing and not more than 80% of a stationary spatial volume of the interior of the rolling bearing,
    wherein the lubricating grease includes a base oil having a dynamic viscosity at 40° C. of 13-73 cSt, and a thickening agent of aromatic urea family,
    wherein the entire spatial volume is an entire interior volume of the bearing minus a total volume of the rolling elements and the retainer,
    wherein the stationary spatial volume is a portion of the entire spatial volume where neither the rolling elements nor the retainer passes while the bearing is rotating, and
    wherein the rolling bearing is a radial bearing and the rolling elements are balls, and the stationary spatial volume includes a space on each side of the balls in an axial direction of the radial bearing.

2. The rolling bearing of claim 1, wherein the base oil contains ether oil.

3. The rolling bearing of claim 1, wherein the base oil is a mixture of ether oil and poly-α-olefin oil.

4. The rolling bearing of claim 3, wherein the base oil is a mixture of 15 to 95% by weight of ether oil and 5 to 85% by weight of poly-α-olefin oil.

5. The rolling bearing of claim 1, wherein the aromatic urea thickening agent comprises an aromatic diurea.

6. The rolling bearing of claim 5, wherein the aromatic diurea has in its molecular structure 4,4'-diphenylmethane diisocyanate as isocyanate groups.

* * * * *